Patented Mar. 3, 1953

2,630,453

UNITED STATES PATENT OFFICE 2,630,453

METHOD FOR MAKING 1,3,3-TRICHLORO-ALLYL CHLOROACETATE

Earl W. Gluesenkamp, Centerville, and Tracy M. Patrick, Jr., Dayton, Ohio, assignors to Monsanto Chemical Company, St. Louis, Mo., a corporation of Delaware No Drawing. Application September 25, 1950, Serial No. 186,677

5 Claims. (Cl. 260—487)

This invention relates to unsaturated, halogenated esters and deals more particularly with polychlorinated allyl esters of chlorine-substituted acetic acid and a process of producing the same.

It is known that when vinyl acetate is treated with carbon tetrachloride in the presence of a peroxidic catalyst there are obtained products having the general formula

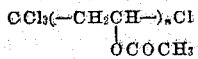

in which $n$ is an integer of from 1 to 8. Such products are disclosed in the Harmon patent, U. S. No. 2,396,261 and an improved process for the preparation of certain members of this series in the presence of a free-radical liberating agent forms the subject of the copending application of Tracy M. Patrick, Jr., Serial No. 186,676, filed September 25, 1950.

Now we have found that when the vinyl ester of a chloroacetic acid is treated with carbon tetrachloride in the presence of a free-radical liberating agent the products are not those which would be expected from the known reactivity of vinyl acetate with carbon tetrachloride. Thus, while the 1:1 addition product of vinyl acetate and carbon tetrachloride is 1,3,3,3-tetrachloropropyl acetate, we have found that the free-radical catalyzed addition product of vinyl chloroacetate and carbon tetrachloride undergoes simultaneous dehydrochlorination forming 1,3,3-trichloroallyl chloroacetate. Dehydrochlorination is similarly effected when reacting carbon tetrachloride with vinyl dichloroacetate and vinyl trichloroacetate, the reaction of these vinyl chloro-esters proceeding substantially according to scheme

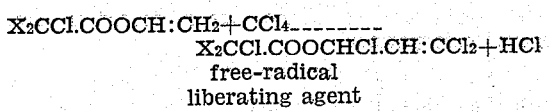

in which X is selected from the class consisting of hydrogen and chlorine.

The above reaction is accompanied by the formation of polycarboxylates in which the carbon tetrachloride has combined with more than one mole of vinyl ester, i. e., reaction products of one mole of carbon tetrachloride with from 2 to 20 moles of the vinyl ester.

The 1:1 reaction products of carbon tetrachloride and a vinyl ester of a chlorine-substituted acetic acid are rather high-boiling liquids which may be advantageously employed for a variety of industrial purposes, for example, as comonomers in the preparation of valuable, flame-resistant copolymers of such polymerizable compounds as styrene, vinyl chloride and methyl methacrylate; as vesicants, as biological toxicants etc. They are also valuable as chemical intermediates.

Reaction products in which carbon tetrachloride has condensed with from 2 to 20 moles of the vinyl ester range from thin liquids to thick, viscous products which, depending upon the carbon tetrachloride: ester ratio, may be used as cross-linking vulcanizing agents for natural and synthetic rubbers, as plasticizers for synthetic resins and plastics, as lubricant adjuvants, etc.

Condensation of carbon tetrachloride with vinyl chloroacetate or with the vinyl ester of dichloroacetic acid or trichloroacetic acid is readily effected by contacting carbon tetrachloride with the vinyl ester at ordinary or increased temperature in the presence of a free-radical liberating agent as catalyst. Optimum yields are generally obtained by operating at temperatures which permit steady decomposition of the catalyst, with consequent steady liberation of trichloromethyl free radicals.

Free-radical liberating agents which may be employed in promoting addition of carbon tetrachloride to vinyl esters of chlorine-substituted acetic acid are compounds which will decompose to give free radicals. Such compounds include peroxygen-type catalysts, for example acyl peroxides such as acetyl, benzoyl, lauroyl or stearoyl peroxides; hydrocarbon peroxides or hydroperoxides such as di-tert-butyl peroxide, di-tert-amyl peroxide, tert-butyl hydroperoxide, cumene hydroperoxide or p-cymene hydroperoxide; and inorganic per-compounds such as hydrogen peroxide, sodium peroxide, sodium perborate, potassium persulfate, and alkali percarbonates; hydrazine derivatives such as hydrazine hydrochloride and dibenzoyl hydrazine; organometallic compounds such as tetraethyl lead, etc. For convenience, the peroxygen type catalysts will be hereinafter referred to as peroxidic compounds. Only catalytic quantities of the free-radical liberating agent need be employed in promoting the addition reaction. Quantities of as little as 0.001 per cent to 1.0 per cent, based on the weight of the vinyl ester, are generally sufficient to give optimum yields of the polychloro esters. In order to avoid detrimental side reactions, quantities of more than 5 per cent of the catalyst, based on the weight of the ester should not be employed. Ultraviolet light may be employed with the catalyst or as the sole catalytic agent.

Substantially equimolar quantities of the carbon tetrachloride and the vinyl chloroacetate may be used; for good yields of the present condensation products, however, we prefer to use an excess of the carbon tetrachloride. The excess actually employed depends upon the type of condensation products desired, as well as upon the manner in which the two reactants are brought together. If maximum yields of the 1:1 condensation products are desired from 3 to 5 parts of carbon tetrachloride per part of the vinyl chloro-ester is advantageous when reaction is effected by mixing the reactants and catalyst and when maintaining the resulting mixture at a temperature permitting steady formation of trichloromethyl radicals. When the higher ratio reaction products are desired, so great an excess need not be employed. The reaction may also be effected by gradually feeding the vinyl chloro-ester into the carbon tetrachloride. Operating in this manner, the carbon tetrachloride need not be present in any substantial excess, even though the desired products are the 1:1 condensates.

The invention is further illustrated, but not limited, by the following example.

*Example*

178 g. of carbon tetrachloride was placed in a flask fitted with a condenser and brought to refluxing temperature (77° C.). 64.0 g. (0.53 mole) of vinyl chloroacetate was then added, dropwise, through the condenser while separately adding to the refluxing carbon tetrachloride a solution of 2.0 g. of benzoyl peroxide in 150 g. of carbon tetrachloride. The addition time for the vinyl ester was 1.5 hours and for the benzoyl peroxide solution, 1.25 hours. The whole was allowed to reflux for a total refluxing time of 43 hours, the temperature remaining at 80° C. during the entire period. After allowing the clear, yellow reaction mixture to cool, it was extracted with aqueous sodium bicarbonate, washed with water, dried over sodium sulfate and filtered. Distillation of the filtrate through a 10″ Vigreux column gave the following fractions:

I. B. P. 76–77° C., unreacted carbon tetrachloride
II. B. P. 95–100° C./1.5 mm., $n^{25}_D$ 1.4940
III. Residue: amber, viscous liquid Redistillation of Fraction II gave the substantially pure 1,3,3-trichloroallyl chloroacetate, B. P. 95–96° C./1 mm., $n^{25}_D$ 1.4940, analyzing 59.46% chlorine (calcd. Cl for $C_5H_4O_2Cl_4$: 59.63%). The position of the double bond was ascertained by infra-red absorption spectra analysis which showed a strong band at 11.9μ, corresponding to the structure $CH_2Cl.COO.CHCl.CH:CCl_2$, rather than the alternative structure

$CH_2Cl.COOCH:CHCCl_3$.

The 1,3,3-trichloroallyl chloroacetate thus employed may be copolymerized with a polymerizable acrylic compound, say, methyl methacrylate, to give copolymers of greatly improved physical characteristics.

Fraction III, i. e., the residue, which comprises the higher carbon tetrachloride-vinyl chloroacetate condensates, is a valuable rubber compounding auxiliary.

Conditions other than those employed in the above example may be used in effecting the free-radical catalyzed condensation of carbon tetrachloride with vinyl chloroacetate. Thus, instead of adding the vinyl ester gradually to the carbon tetrachloride, the two reactants may be mixed at once and the resulting mixture maintained, in the presence of benzoyl peroxide, or another free-radical liberating agent, at a temperature which favors formation of free trichloromethyl radicals. Employing the dropwise procedure of the example, feeding of the vinyl chloroacetate into the carbon tetrachloride may extend during the entire reaction time, with no subsequent heating. In this way the method may comprise a continuous process, in which the product is removed as new quantities of the vinyl chloroacetate are introduced. The benzoyl peroxide or other free-radical liberating agent may be fed into the reacting mixture at any desired rate; addition generally being made in this case only as it becomes depleted.

When operating batch-wise, the reaction time varies with the concentration and nature of the catalyst as well as that of the reactants. An extraneous, inert solvent or diluent e. g. benzene or cyclohexane, may be employed, either to serve as catalyst solvent, for mitigating reaction heat, or to dilute the concentration of the vinyl chloroacetate in the reaction mixture. However, when operating under conditions herein described, such a solvent or diluent generally is of little economic advantage.

What we claim is:

1. The process which comprises contacting carbon tetrachloride with vinyl chloroacetate in the presence of a free-radical liberating agent and recovering 1,3,3-trichloroallyl chloroacetate from the resulting reaction product.

2. The process claimed in claim 1, further characterized in that the free-radical liberating agent is a peroxidic compound.

3. The process claimed in claim 1, further characterized in that the free-radical liberating agent is benzoyl peroxide.

4. The process which comprises refluxing carbon tetrachloride with vinyl chloroacetate in the presence of benzoyl peroxide and recovering 1,3,3-trichloroallyl acetate from the resulting reaction product.

5. The process which comprises gradually adding vinyl chloroacetate into carbon tetrachloride in the presence of a free-radical liberating agent and recovering 1,3,3-trichloroallyl chloroacetate from the resulting reaction product.

EARL W. GLUESENKAMP.
TRACY M. PATRICK, Jr.

REFERENCES CITED

The following references are of record in the file of this patent:

UNITED STATES PATENTS

| Number | Name | Date |
|---|---|---|
| 2,221,275 | Taylor | Nov. 12, 1940 |
| 2,396,261 | Harmon | Mar. 12, 1946 |

FOREIGN PATENTS

| Number | Country | Date |
|---|---|---|
| 569,407 | Great Britain | May 23, 1945 |